B. S. AIKMAN.
PRESSURE REDUCING VALVE.
APPLICATION FILED JAN. 20, 1916.

1,258,851.

Patented Mar. 12, 1918.
2 SHEETS—SHEET 1.

Inventor
Burton S. Aikman
By Brown, Hanson & Boettcher
Atty's

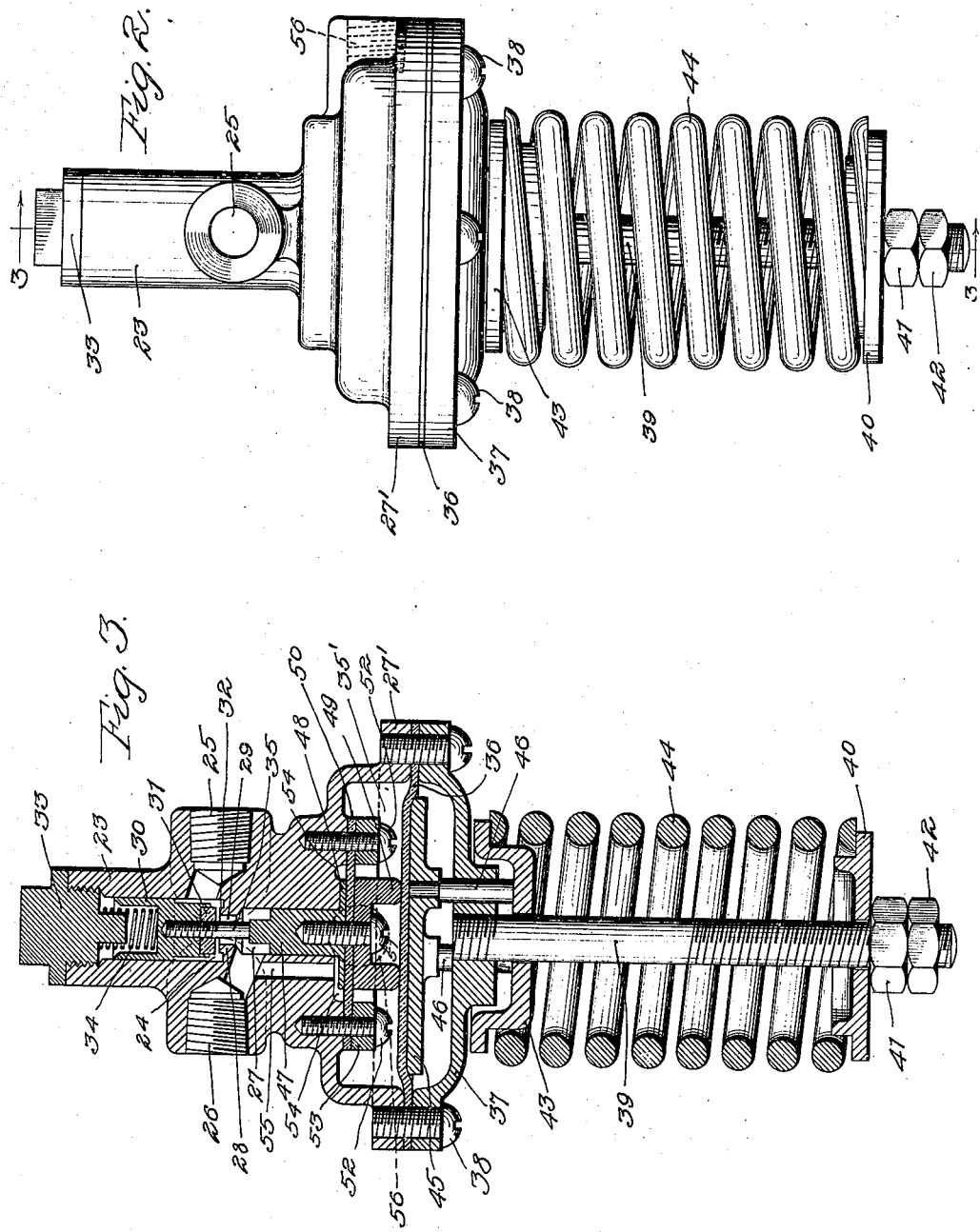

UNITED STATES PATENT OFFICE.

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

PRESSURE-REDUCING VALVE.

1,258,851.    Specification of Letters Patent.    Patented Mar. 12, 1918.

Application filed January 20, 1916. Serial No. 73,100.

*To all whom it may concern:*

Be it known that I, BURTON S. AIKMAN, a citizen of the United States, residing at Milwaukee, in the county of Milwaukee and State of Wisconsin, have invented a certain new and useful Improvement in Pressure-Reducing Valves, (Case 17,) of which the following is a full, clear, concise, and exact description, reference being had to the accompanying drawings, forming a part of this specification.

My invention relates to pressure reducing valves and particularly to such valves as employed in isolated pumping systems for furnishing water to a residence or an industrial establishment from a nearby source, such as a well.

Systems of this kind are known generally as systems which supply water "fresh from the well"—that is, without the intervention of a storage or reserve tank, and which will be under "faucet control," by which I mean that the flow of water is controlled by the acts of opening and closing the faucets which form the supply outlets of the system.

To supply water fresh from the well and to maintain the flow of water under faucet control, is a matter of prior art. In such a system an air displacement pump is employed, the pump being under a continuous air pressure, and the opening of one or more faucets of the system causing the air to displace the water to discharge the latter. The air is stored in a reservoir which is recharged, for example, from day to day when an engine is used for motive power, or automatically recharged several times a day when an electric motor is used. In order to use the air most economically, it has been the practice to insert a pressure reducing valve in the pipe line between the air reservoir and the pump, the reservoir pressure being thus reduced so that the pressure maintained upon the pump is just sufficient to lift the water to the point of use, to overcome the friction of the water flowing through the pipes and fittings and to provide for sufficient faucet pressure.

The amount of pressure necessary to overcome the friction of the water flowing through the system varies in proportion to the quantity flowing, while the pressure necessary to secure the elevation of the water to the point of use does not vary for any given installation. To the latter pressure may be added that pressure required to maintain sufficient faucet pressure.

In the prior art, in order to allow for the pressures above described, it has been necessary to set the reducer to provide sufficient pressure upon the pump to overcome the friction of the water when the pump is delivering its full capacity, in addition to the pressure for the lifting of the water to the point of use and for the desired faucet pressure. After the reducer was once set, it was fixed at that pressure and delivered air at that pressure to the pump, displacing the water in the cylinder of the pump, regardless of the rate of flow, so that when only a small flow was taking place, the air consumed was more than needed because the reducer was set for the maximum flow or capacity of the pump, causing great loss since the service required from the faucet varies from a very small flow to the full capacity of the pump, as will readily be appreciated. In this connection it is necessary also to consider the friction encountered in forcing the water through the pump, wherein, for large flows, greater pressure is required than for small flows, and it therefore becomes necessary with these prior art devices to maintain sufficient pressure upon the pump to overcome the friction encountered in the maximum flow, regardless of how small the flow may be, and in fact notwithstanding that most of the time there is no flow at all. This last mentioned point is important when it is considered that when all the faucets are closed, and no water being drawn, the high pressure is constantly maintained on all joints, tending to cause them to leak and wear unduly.

A further consideration is that when but one faucet of the system was opened, it was subjected to a much higher pressure than desired, because the reducer was necessarily set at a pressure to maintain the flow at all the faucets, up to the capacity of the pump, thus giving too great a pressure when but one faucet was in use and an insufficient pressure when all were in use.

I have invented a pressure reducing valve which, when once set to give sufficient pressure at the faucets when the pump is delivering its full rated capacity, will automatically adjust the pressure upon the pump to decrease it in proportion to the reduction in friction encountered in the system, depending upon the quantity of the flow. In this way, there is built up upon the constant pressure required to lift the water to the point of use, additional varying pressure corresponding to the requirement to overcome the friction encountered in the system depending upon the quantity of the flow and to correspond to the requirement depending upon the number of faucets in use and the consequent spending of the so-called faucet pressure.

In the form of my invention, which I have given practical test, and which is specifically illustrated in the accompanying drawings, I provide means for maintaining a definite relation between the resisting influence upon the valve and the pressure of the water in the discharge portion of the system, whereby this resisting influence may be subtracted from as the conditions of the system require in order to economize the air. I have drawn the more specific of the appended claims in a more or less limited way upon the precise structure illustrated, but I have drawn the broader of the appended claims in such a way as to cover any structure which secures the same results by the same mode of operation. I have also drawn claims which bring in the relation of the pressure reducing valve of my invention to the system since there, beyond the valve itself, lies a novel thought. In the accompanying drawings,—

Fig. 2 is an elevational view of the valve of my invention; and

Fig. 3 is an axial sectional view taken on the plane of the line 3—3 of Fig. 2 and looking in the direction indicated by the arrows.

Figure 1:
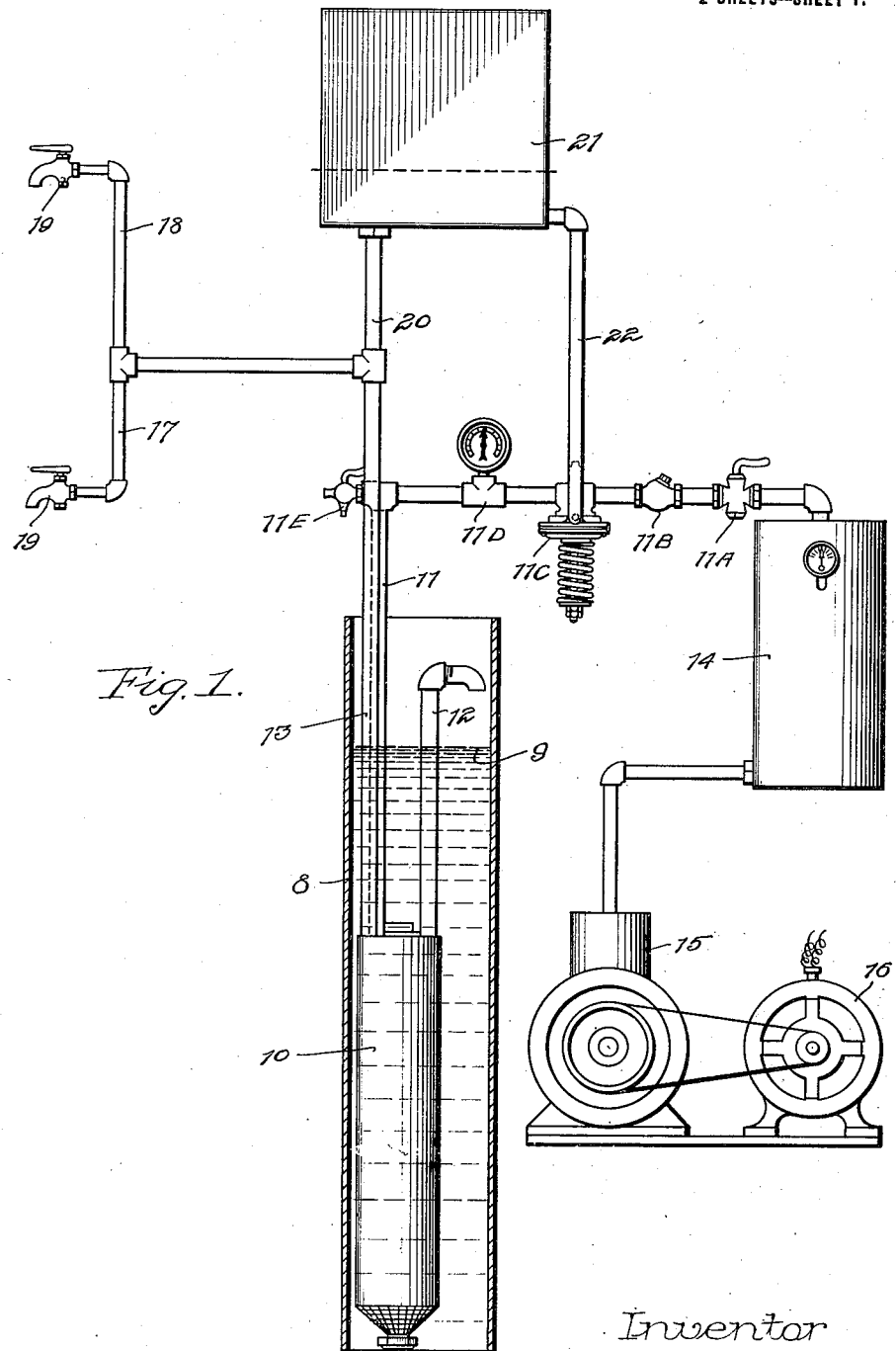
Figure 1 is a more or less diagrammatic view illustrating the system as a whole.

Referring first to Fig. 1, it will be seen that the well curbing is illustrated at 8, the water level being indicated at 9. The pump structure, which I have indicated broadly by the reference character 10, is disposed in the well at a suitable distance below the water level therein. My present invention is not concerned with the specific structure of the pump 10 and it will suffice for the purposes of this case to point out merely that the pump is a displacement pump which, when pressure is maintained thereupon, automatically operates to admit water from the well and to discharge the water into the discharge portion of the system, as for instance, the pump illustrated in my copending application, Serial No. 51,524, filed September 20, 1915.

The pump structure has leading therefrom three pipes, an air pressure pipe 11, an exhaust pipe 12, and a water discharge pipe 13. The air pressure pipe 11 is connected with a compressed air tank 14, in which air is compressed by means of a compressor 15, operated, for instance, by an electric motor 16. In the pipe 11, the cut-off valve $11^A$, air strainer $11^B$, reducing valve $11^C$, gage $11^D$, and drain cock $11^E$, are provided, the reducing valve $11^C$ being the structure with which my present invention is particularly concerned.

The water discharge pipe 13 leads to various branch pipes 17 and 18, each of which in turn leads to an outlet faucet 19. The water discharge pipe 13 is also connected with a chamber 21, closed except for the entry pipe 20, and the pipe 22 which leads to the pressure reducing valve, as will be pointed out presently. This chamber 21 acts merely as an air cushion so that during the filling operation of the pump, which takes place very quickly, the pressure stored in the chamber 21, may act to maintain normal pressure upon the discharge system so as to prevent fluctuations in the flow. The chamber 21 is merely a means to increase the capacity of the discharge portion of the system and is fundamentally a part thereof.

Referring now to Figs. 2 and 3, it will be seen that I provide a valve casing 23 of general cylindrical shape with side inlet and outlet, the valve mechanism being set in said casing on its vertical axis. Centrally disposed in this casing is the valve chamber 24 to which is directly connected the air inlet 25, which, in turn, is connected with the air reservoir through the strainer and cut-off valve, as described. The air outlet, the side which goes to the water pump is indicated at 26, and it will be seen that it is directly connected with an axial bore 27 which is separated from the axial valve chamber 24 by means of a partition 28, in which an axial opening 29 is provided.

A valve member 30 is disposed for vertical movement in the valve chamber 24 and its face is provided with a piece of compressible material 31 which is adapted to coöperate with the valve seat 32 surrounding the opening 29. The top of the valve chamber 24 is closed by a plug 33 between which and the valve 30 a spring 34 is disposed. Screwed into the valve member 30 is a stem 35 which extends downwardly through the opening 29 for a purpose which will be described presently.

The underside of the casing 23 forms the upper portion of a diaphragm chamber 35' defined by a flexible diaphragm 36 clamped to the flange 27' of the casing 23 by means of the lower cover plate 37 and the screws 38, 38. Screwed into the lower cover plate 37 is a downwardly extending post 39 at the bottom of which a circular plate 40 is supported upon a nut 41, the latter being held in place by means of a lock nut 42. A collar 43 loosely surrounds the post 39 and a coiled spring 44 is disposed between the plate 40 and the collar 43.

Between the diaphragm 36 and the lower cover plate 37, a diaphragm plate 45 is disposed. This plate, by means of pins 46, 46, extending through the lower cover plate 37, is mechanically connected with the collar 43, so that the influence of the spring 44 upon the collar 43 may be transmitted to the diaphragm plate 45 and in turn to the diaphragm 36.

A stem 47 is mounted snugly for reciprocating movement in the axial bore 27, this stem being so arranged that at its top it may engage with the stem 35, which has hereinbefore been referred to, and being provided at its bottom with a diaphragm plate 48 between which, and a cup member 49, a second diaphragm 50 is clamped by means of a screw 51. This second diaphragm 50 is clamped to the under inner face of the casing 23, by means of screws 52, 52 and a clamping ring 53, and covers a diaphragm chamber 54, which, by means of a passageway 55, is connected with the air outlet as shown.

The diaphragm chamber 35′ is provided with a port 56 in which the end of the pipe 22, referred to in connection with the description of Fig. 1, is connected, it being thus apparent that water at the pressure of the water in the discharge part of the system, fills the diaphragm chamber 35′ and exerts its pressure on the upper side of the diaphragm 36.

It will now be seen that the spring 34 tends to move down the valve member 30 so as to close the passageway 29 between the inlet and outlet openings of the structure, and that the spring 44 tends to raise the valve from its seat. Thus the spring 44 opposes the tendency of the valve 30 to close, and this opposition goes to the extent determined by the adjustment of the plate 40 as to height.

Let it be assumed then that the valve structure is so adjusted in this primary way as to provide sufficient faucet pressure with the pump delivering at full capacity. The air from the reservoir, as restricted by the position of the valve 30, is therefore effective upon the posterior or exit side of the opening 29. This air, coming down by way of the passageway 55, exerts its influence in the diaphragm chamber 54 and upon the diaphragm 50. If the pressure falls slightly, posterior to the opening 29, the diaphragm 50 will rise a little so as to open the valve member 30 farther, thus bringing the pressure posterior to the opening 29, back to normal. On the other hand, if the pressure posterior to the opening 29 should rise, the tendency for the diaphragm 50 will be to allow the valve member 30 to close slightly. In this way, other things being equal, the pressure is maintained substantially constant.

The connection of the pipe 22 to the discharge portion of the system, however, makes the discharge pressure effective in the diaphragm chamber 35′ and upon the diaphragm 36, which is larger than the diaphragm 50. Thus, the greater the pressure in the diaphragm chamber 35′, the greater will be the subtraction from the effort of the spring 44, and in this way uniform faucet pressure is maintained. If a greater flow takes place, the discharge pressure drops and consequently the opposition to the action of the spring 44 is reduced. On the other hand, with a very small flow taking place, a very large proportion of the influence of the spring 44 is counteracted by the pressure in the diaphragm chamber 35′. When the discharge flow is reduced, the friction incident to forcing the water through the system will be correspondingly reduced with a corresponding reduction in the amount of work to be done. Under these conditions, as will now be evident, the valve member 30 will drop to cut down the pressure posterior to the opening 29. When the diaphragm 36 moves downwardly, the action allows the air pressure above the diaphragm 50 to cause that diaphragm to move down correspondingly, and the regulating action, which has hereinbefore been described, is maintained whatever be the position of the diaphragm 36.

When the valve is set to provide for the maximum flow of the pump, and the pump is operating at less than its maximum rate, the valve holds the pressure on the pump at less than its maximum,—holding it at a position just sufficient to deliver the water at the rate of flow required, and at the faucet pressure required. If the requirement is increased by more faucets being opened, there would be an immediate increase in the air pressure to maintain a uniform pressure at the faucets.

When the rate of delivery of water from the pump is high, and the friction losses in the pump and piping are great, the air pressure will be automatically raised accordingly to meet the demand. Correspondingly, when the rate of flow from the pump is low and the losses from the friction of flow are small, the air pressure will be automatically lowered to maintain only the pressure necessary to provide for the conditions thus assumed.

I claim:

1. In combination, a casing having an inlet and an outlet and an opening connecting said inlet and said outlet, a valve controlling said opening, means subject to the pressure on the outlet side of said opening for opening and closing said valve, means tending to open said valve, and means for counteracting the effect of said opening means.

2. In combination, a casing having an outlet and an inlet and an opening connecting said outlet and said inlet, a valve controlling said opening, adjustable spring means tending to open said valve, means controlled by liquid pressure for counteracting the effect of said spring means and means controlled by the pressure at the outlet side of the valve opening for closing said valve.

3. In combination, a casing having an inlet and an outlet and an opening connecting said inlet and said outlet, a valve controlling said opening, means subject to the pressure on the outlet side of said opening for opening and closing said valve, adjustable means tending to open said valve, and pressure controlled means for counteracting the effect of said opening means.

4. In combination, a casing having an inlet and an outlet and an opening connecting said inlet and said outlet, a valve controlling said opening, means subject to the pressure on the outlet side of said opening for opening and closing said valve, means supplementing the opening influence of said valve, and means for counteracting the effect of said supplementary means.

5. In combination, a casing having an inlet and an outlet and an opening connecting said inlet and said outlet, a valve controlling said opening, means subject to the pressure on the outlet side of said opening for opening and closing said valve, adjustable means supplementing the opening influence of said valve, and means for counteracting the effect of said supplementary means.

6. In combination, a casing having an inlet and an outlet, and an opening connecting said inlet and said outlet, a valve controlling said opening, a spring tending to close said valve, a diaphragm connected with said valve, a diaphragm chamber for said diaphragm, said diaphragm chamber being connected with said outlet, a second diaphragm, a second diaphragm chamber being formed between said diaphragm and a spring tending to move said diaphragm to open said valve, increase of pressure in said second diaphragm chamber acting in opposition to said spring.

7. In combination, a pump operating by the application of air under pressure, an air reservoir for air under pressure, a discharge system for said pump, an air line between said reservoir and said pump, a valve in said air line, means controlled by pressure of the air between the valve and the pump tending to close said valve, and means subject to the pressure in said discharge system acting in opposition to said closing means.

8. In combination, a pump operating by the application of air under pressure, an air reservoir for air under pressure, a discharge system for said pump, an air line between said reservoir and said pump, a valve in said air line, means subject to the pressure applied at the pump for opening and closing said valve, supplemental means tending to close said valve, and means subject to the pressure in said discharge system acting in opposition to said closing means.

9. In a valve an inlet and an outlet having a passage between them, a valve controlling the passage, a pair of diaphragms of different effective areas controlling said valve, a chamber for each diaphragm, means for admitting motive fluid at the pressure prevailing on the outlet side of the valve passage to the diaphragm of less effective area, and means for admitting liquid under pressure to the diaphragm of greater effective area.

10. In a valve an inlet and an outlet having a passage between them, a valve controlling the passage, a pair of diaphragms of different effective area controlling said valve, a chamber for each diaphragm, means for admitting motive fluid at the pressure prevailing on the outlet side of the valve passage to the diaphragm of less effective area, means for admitting liquid under pressure to the diaphragm of greater effective area, and spring means for connecting said diaphragm.

11. In combination, a valve controlling motive fluid, a diaphragm of less effective area, a diaphragm of greater effective area, a connection between said diaphragms, a fluid pressure chamber formed between said diaphragm, a fluid pressure chamber exerting a control on one of the diaphragms and a spring exerting a control on the other of said diaphragms, said diaphragms controlling said valve.

12. In combination, a valve, a diaphragm having motive fluid pressure upon one side and liquid under pressure on the other side controlling the opening and closing of the valve, and a second diaphragm having liquid pressure on one side and a spring pressing on the other side, said second diaphragm also controlling said valve.

13. In combination, a valve having an inlet for motive fluid, an outlet for motive fluid, a movable valve member between said inlet and outlet, means controlled jointly by the pressure of the motive fluid on the outlet side of the valve and by the pressure of the liquid for governing said valve.

14. In combination, a valve having an inlet for motive fluid, an outlet for motive fluid, a movable valve member between said inlet and outlet, means controlled jointly by the pressure of the motive fluid on the outlet side of the valve and by pressure of the liquid for governing said valve, and means controlled jointly by the pressure of the liquid and by an adjustable spring for governing said valve.

15. In combination, a pump having an inlet for motive fluid, a discharge for the liquid pumped, a valve controlling the admission of motive fluid to the inlet of the pump, means controlled by the fluid pressure admitted to the pump and by the pressure of the discharged liquid for controlling the valve and further means controlled by the pressure of the discharged liquid and by a spring for governing the valve.

In witness whereof, I hereunto subscribe my name this 17th day of January A. D. 1916.

BURTON S. AIKMAN.